United States Patent
Doyle et al.

(10) Patent No.: US 6,405,210 B1
(45) Date of Patent: Jun. 11, 2002

(54) DATA PROCESSING SYSTEMS

(75) Inventors: Michael Doyle; Gerard McManus; Joseph Oates, all of Dublin (IE)

(73) Assignee: Application Building Blocks Limited, Dublin (IE)

( * ) Notice: Subject to any disclaimer, the term of this patent is extended or adjusted under 35 U.S.C. 154(b) by 0 days.

(21) Appl. No.: 09/274,104

(22) Filed: Mar. 23, 1999

(30) Foreign Application Priority Data

Mar. 23, 1998 (EP) .............................................. 98650020

(51) Int. Cl.[7] .............................................. G06F 17/30
(52) U.S. Cl. ................... 707/103 R; 707/100; 707/102; 709/316; 717/108
(58) Field of Search ................. 707/103, 102, 707/4, 103 R, 100, 104; 345/642, 419, 422, 423; 709/316; 717/108, 104, 137

(56) References Cited

U.S. PATENT DOCUMENTS

| | | | |
|---|---|---|---|
| 5,297,279 A | | 3/1994 | Bannon et al. ............. 395/600 |
| 5,448,727 A | | 9/1995 | Annevelink ................. 395/600 |
| 5,546,577 A | | 8/1996 | Marlin et al. ............... 395/600 |
| 5,717,925 A | * | 2/1998 | Harper et al. ............... 395/613 |
| 5,799,310 A | * | 8/1998 | Anderson et al. ........... 707/102 |
| 5,878,411 A | * | 3/1999 | Burroughs et al. ............ 707/4 |
| 5,937,409 A | * | 8/1999 | Wetherbee .................. 707/103 |
| 6,047,284 A | * | 4/2000 | Owens et al. .................. 707/4 |
| 6,061,515 A | * | 5/2000 | Chang et al. ............... 395/702 |

FOREIGN PATENT DOCUMENTS

WO    WO95/00901    1/1995

* cited by examiner

Primary Examiner—Hosain T. Alam
Assistant Examiner—Tam V Nguyen
(74) Attorney, Agent, or Firm—Jacobson Holman, PLLC

(57) ABSTRACT

A data processing system (1) has a data processing section (2) having user interface objects (10), work flow activity objects (11) and primitive objects (12). WFA objects (11) access a database (5) via a state machine (13). A data record is requested by a primitive object (12) being requested. The state machine (13) responds by retrieving a row of data from a table (6) and using this to instantiate a primitive object according to the data and the instruction from the requesting WFA object (11). A primitive object reference is stored in a temporary memory stack (15) and the reference is also copied to the requesting WFA objects (11). The primitive object (12) is then used subsequently for transaction processing until a transaction is complete. At this stage, the state machine (13) flushes the primitive objects to the database (5).

9 Claims, 5 Drawing Sheets

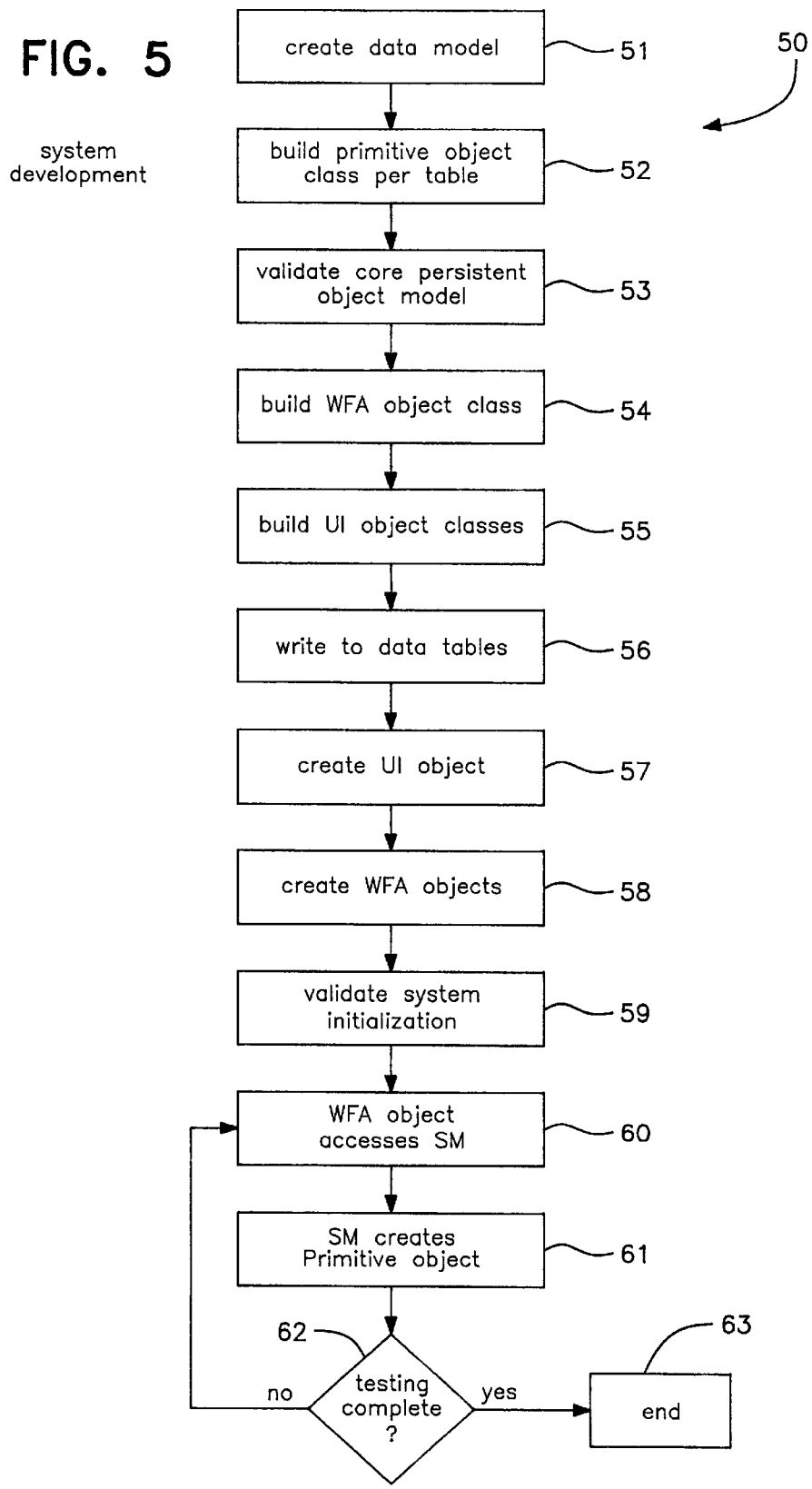

DATA PROCESSING SYSTEMS

FIELD OF THE INVENTION

The invention relates to a data processing system comprising a processor connected to memory, a user interface, an output interface, and a data storage device, wherein the processor is operable according to program commands directing object-orientated processing. The invention also relates to development of such systems.

PRIOR ART DISCUSSION

Many such systems exist at present. An example is that described in U.S. Pat. No. 5,546,577 to Marlin et al. This system has a service layer within a desktop management interface and which addresses an object orientated database. a system described in U.S. Pat. No. 5,448,727 to Annevelink includes a database interface which calls a query compiler and an optimiser. These compile a query tree into a run tree which is queried by a query interpreter block. A memory cache is used during a database access. A system described in U.S. Pat. No. 5,297,279 to Bannon et al has an object manager for retrieving objects and controlling internal objects. A system described in WO9500901 (Taligent) includes a database which stores components and properties and a compiler which calculates dependencies.

While the presently available systems are generally quite effective, there are some limitations in their operation. For example, complex control is often required to achieve consistency and integrity of data when different objects are performing transaction processing using data from the same database. Also, the response time for database fetch cycles can cause delays in processing, particularly for complex systems with many interrelated objects.

Another problem at present is that development of such systems is a complex and timeconsuming task.

OBJECTS OF THE INVENTION

It is an object of the invention to provide a data processing system of the type set out above which performs data retrieval more efficiently, ensures a greater level of data consistency across all objects, and which ensures data integrity to a greater extent.

There is also a need for a method for developing such systems which allows a shorter lead time than has been the case in the past.

SUMMARY OF THE INVENTION

According to the invention, there is provided a data processing system comprising a processor connected to memory, a user interface, an output interface, and a data storage device storing a database, wherein the processor is operable according to program commands directing object-oriented processing, wherein the processor operates as directed by a work flow activity object for transaction data processing, as directed by a user interface object for user interfacing, and as directed by a data management state machine for interaction with the data storage device;

an object is operable to direct creation of an instance of the state machine for each transaction;

the work flow activity object is operable to request a primitive object from the state machine when data is required; and the state machine is operable to access a database and to build a primitive object corresponding to each data request, each primitive object being operable in conjunction with a work flow activity object to perform transaction processing.

The state machine performs a very important role in operation of the system. It allows the work flow activity objects to maintain transaction processing control, however, it divorces these objects from the database because they simply request an object and do not know the source of the data. Also, because data is supplied as an object, these objects may then be used in subsequent processing by work flow activity objects. This allows substantially improved processing efficiency.

In one embodiment, the database has a relational table structure, and the state machine is operable to build a primitive object associated with a single table row. This provides a link between the primitive objects and the database which is very simple and effective. Preferably, each work flow activity object is operable to pass a primitive object identifier to the state machine to request data, and the state machine is operable to build the primitive object by instantiating a primitive object class. Ideally, the database includes one relational database table per primitive object class.

In one embodiment, the state machine is operable to store a reference to each primitive object in a temporary stack and to pass the reference to the requesting work flow activity object. In this latter embodiment, the state machine is preferably operable to search the stack for an existing required primitive object before building a fresh primitive object. These features allow more efficient data retrieval because it is not necessary to access the database with a fetch cycle each time a data record is to be retrieved. They also help to ensure integrity of data because the original primitive object is maintained in the stack and is never copied, only a reference being returned to the requesting work flow activity object.

In one embodiment, each work flow activity object is operable to pass a data extract to the user interface object, and the user interface object is operable to manipulate the data extract and to request the source work flow activity object to validate the data manipulation. Preferably, the user interface object is operable to initiate a transaction termination by instructing the state machine to perform a transaction commit.

In another embodiment, the state machine is operable to flush all modified primitive objects of the stack to the database for a transaction commit. Thus, the unit of time for the primitive object stack maintained by the state machine is a single transaction and there is a complete update when this is complete. Again, this helps to ensure data integrity in the system.

In another embodiment, each primitive object is operable to automatically notify the state machine when updated. This feature allows the primitive objects to be updated by the work flow activity objects without sacrificing data integrity. The work flow activity objects do not need to become involved in ensuring that the update takes place as it is performed automatically by the primitive object.

In one embodiment, each work flow activity object is operable to instruct the state machine to handle an embedded transaction, and the state machine is programmed to respond by creating a new instance for the embedded transaction. This allows handling of complex transaction processing in a simple manner.

In one embodiment, the state machine is operable to validate completion of all lower-level instances before terminating a transaction. This mechanism provides nesting of the primitive object stacks in a simple manner which ensures data integrity.

According to another aspect, the invention provides a data processing system development method comprising the steps of:

developing a core persistent object model comprising relational database tables and a primitive object class associated with each table, the class being instantiated by retrieval of a row from the associated table;

developing user interface and work flow activity classes;

instantiating the user interface class by operator interaction to create user interface objects;

user interface objects instantiating work flow activity objects; and work flow activity objects requesting a state machine to build a primitive object, and the state machine retrieving a data row and using it to build the primitive object.

The core persistent object model is a simple and well-ordered structure which links data with objects to allow building of primitive objects for testing as the work flow activity objects perform data processing. This dramatically reduces the time involved for building the primitive objects. Also, because the work flow activity objects do not access the database, the nature of the database is transparent and this allows the work flow activity objects to have simpler code which is more easily developed and tested.

In one embodiment, the work flow activity objects transfer a primitive object identifier to the state machine as part of the request.

Preferably, the state machine maintains a temporary stack of object references for a transaction and passes object references from the stack for subsequent requests.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIG. 5 is a flow diagram illustrating a system development method of the invention.

DESCRIPTION OF THE EMBODIMENTS

Figure 1:
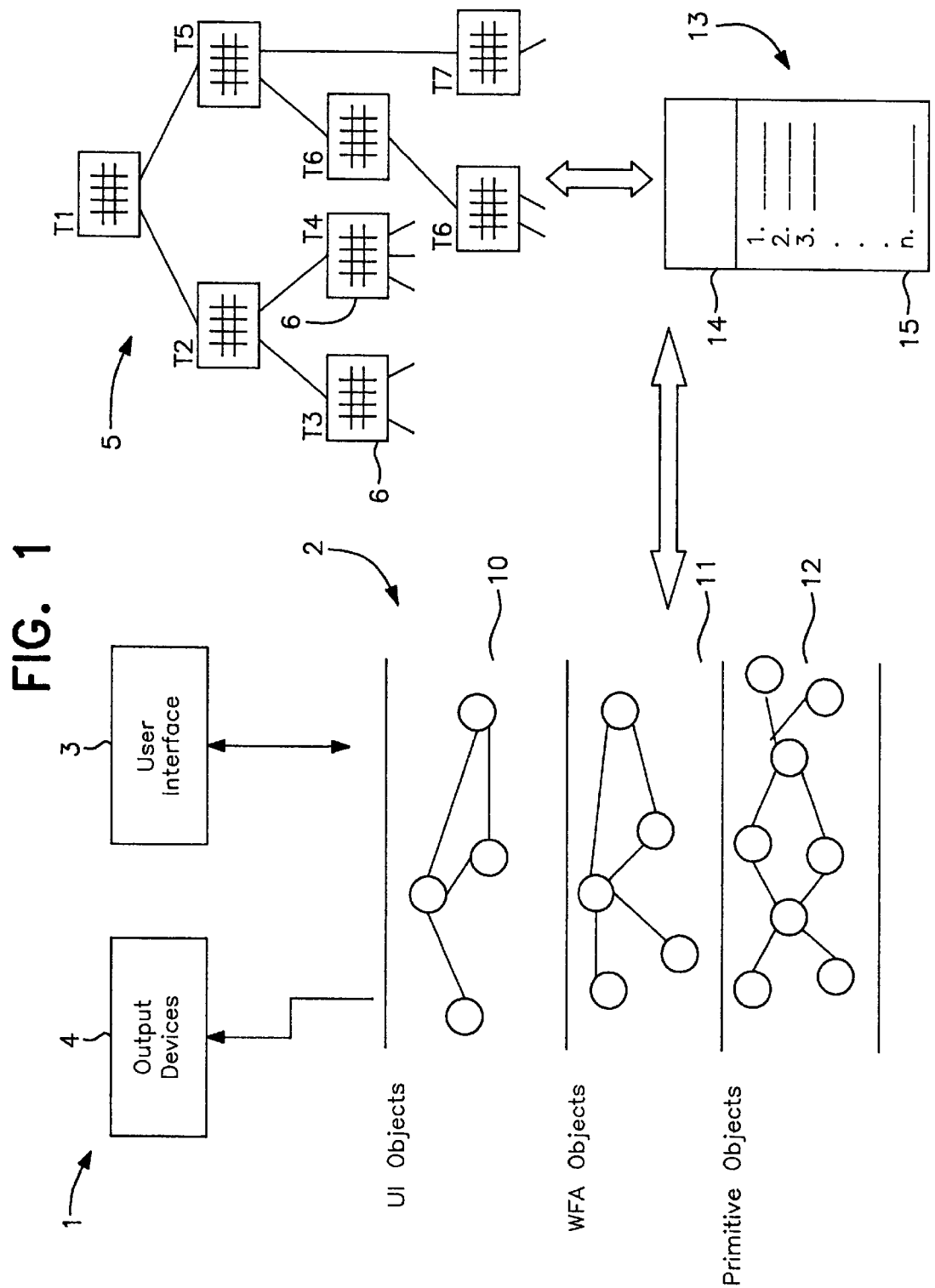
FIG. 1 is a diagrammatic representation of a data processing system of the invention.

Referring initially to FIG. 1, there is shown a data processing system 1 of the invention. The system 1 comprises a data processing section 2 comprising various objects which are operable according to object-orientated mechanisms. The system 1 also comprises a user interface 3 and output devices 4 including a printer, a screen and a modem. In addition, the system 1 comprises a database 5 comprising relational tables 6, (T1, T2 . . . ) which are related according to primary and foreign keys in conventional relational database methodology. The tables 6 within the database 5 are accessed by a state machine 13 which comprises code 14 and a temporary memory stack 15.

The processing section 2 comprises user interface (UI) objects 10, work flow activity (WFA) objects 11, and primitive objects 12. These are described in more detail below.

Figure 2:
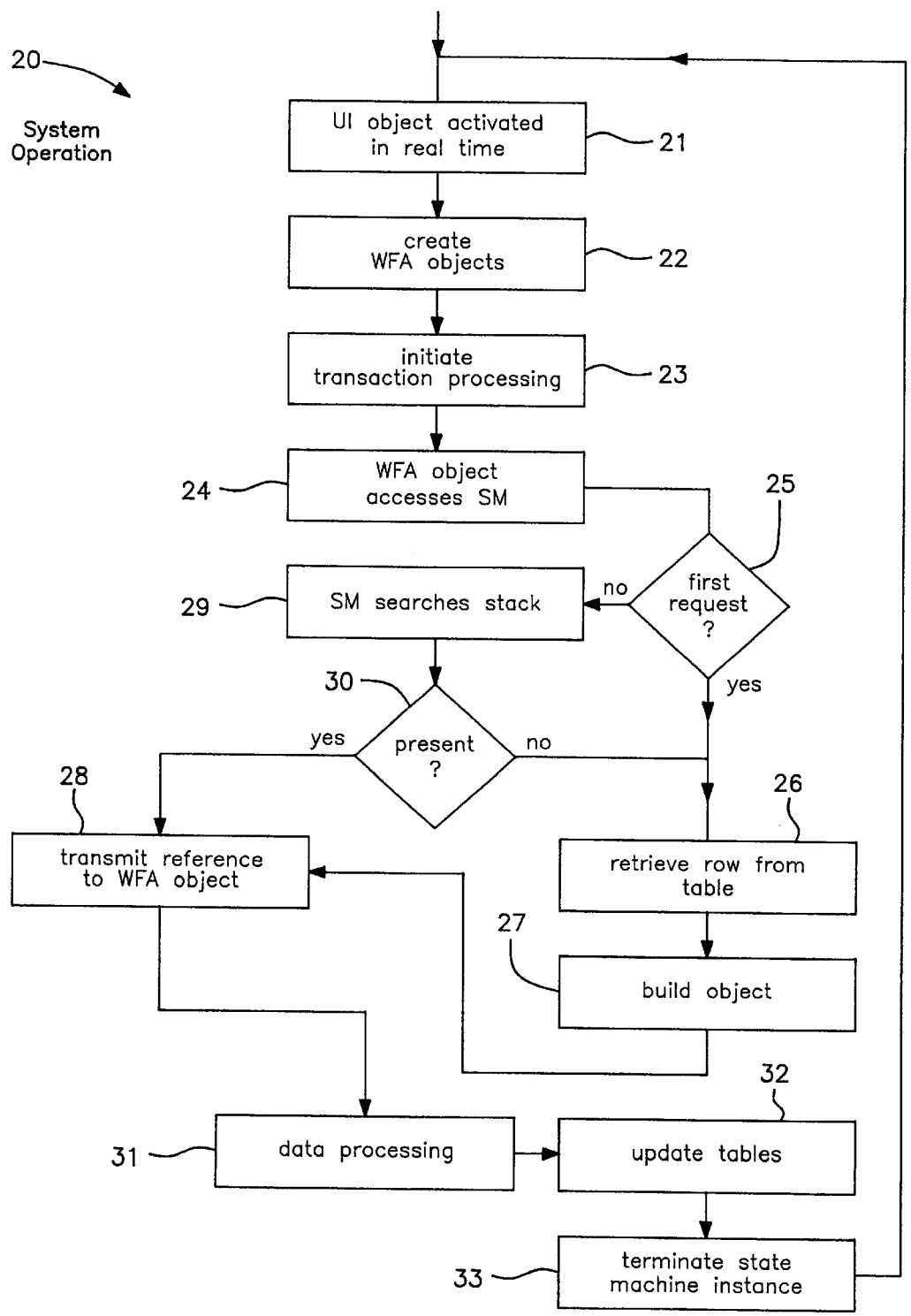
FIGS. 2 and 3 are flow diagrams illustrating operation of the system.
Figure 3:
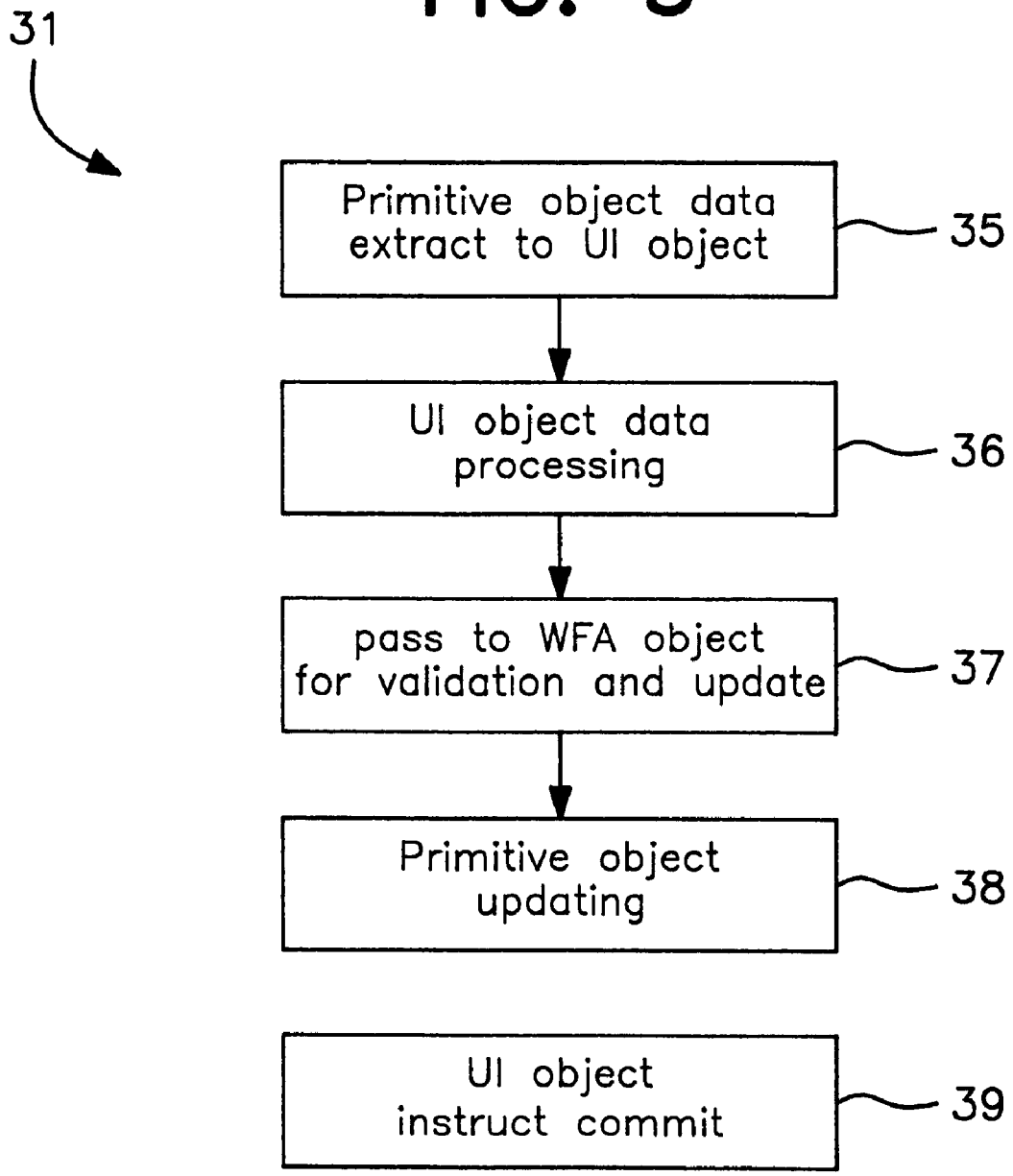

Referring now to FIGS. 2 and 3, operation of the system 1 is now described as a method 20. In step 21, a UI object is activated in real time. An example is an instruction from a user to create a sales order, in which case an interfacing sales order object receives the request. In step 22, a WFA object 11 is created and a transaction identifier is passed to it. The generation of a sales order is regarded as a transaction, however, to implement the transaction, there may be a number of additional WFA objects 11 created by the sales order WFA object to process the transaction. In step 23 transaction processing is initiated by creating an instance of the state machine 13 for the transaction. The instance may be created under instruction of the relevant UI object 10, or if no UI object is involved (such as in a batch transaction) by a WFA object 11. The instance which is created includes program code to perform operations requested by the WFA objects 11, and a temporary memory stack.

The WFA objects are programmed independently of the nature of the database as they do not need to fetch the data and do not know its source. Instead, the WFA objects 11 are programmed to access the state machine in step 24 and request it to create a new object corresponding to data which is required. In this embodiment, there is a primitive object class associated with each table 6 and a primitive object is associated in a one-to-one relationship with each row of one of the database tables 6. Each row is one data record.

For the first data access request for a transaction, as indicated by the decision step 25, in step 26 the state machine searches its stack to determine if a primitive object has been created as it doesn't know that it is a first request. It then retrieves the relevant row from the table. The row is identified because the request included a primitive object identifier for instantiation and the relevant primitive object class. As stated above, there is one such class per table 6 and the classes are defined by the state machine 13 identifying the associated table, column names, primary keys, and balance fields. Thus, the WFA object 11 supplies sufficient information for the state machine 13 to build a primitive object once the relevant data is retrieved. This is performed in step 27, and in step 28 a reference to the object is transmitted to the requesting WFA object 11. An important aspect is that the primitive object is stored only once in memory and both the requesting WFA object 11 and the state machine 13 store only references to it.

If the WFA object 11 request is not the first, in step 29 the state machine 13 searches the stack 15 to determine if the primitive object has already been created. If not, steps 26, 27 and 28 are then performed. If already created, the state machine 13 transmits a reference to the requesting WFA object 11.

Data processing is performed in step 31, as outlined in detail in FIG. 3. In step 35 the WFA object 11 transfers a data extract to the controlling UI object 10. The UI object 10 then processes this data according to user instructions in step 36. In step 37 the UI object 10 in response to a user input initiates a commit process for the transaction by passing the processed data to the WFA objects and they in step 38 update the relevant primitive objects. In step 39 the UI object 10 instructs the state machine 13 to perform a commit.

When transaction processing is relatively complex, each WFA object 11 may request the state machine 13 to embed a transaction. This causes the state machine to create a new instance for the embedded transaction and to relate this instance with the original one. The original transaction may not then be complete until the subsidiary or embedded transaction is complete or discarded. The second instance has a separate memory stack for primitive objects, and therefore the state machine searches both stacks when a fresh data record request is received from a WFA object 11.

The UI object 10 for the transaction instructs the state machine 13 to perform a commit at the end of the transaction. In step 32 the state machine flushes the stack to the database to perform a comprehensive update for all of that transaction and this instance of the state machine is then terminated in step 33.

It will be appreciated that by building a primitive object for each data record request, the WFA objects 11 are divorced from the database structure. They do not know where the state machine 11 retrieves the data. For example, a flat ASCII file could be used instead of a relational database. Indeed, different data sources may be used. The WFA objects 11 are only required to provide sufficient information to identify a primitive object. It will also be appreciated that the invention provides for a very fast response time because multiple requests for the same record are satisfied from the state machine stack without the need for a fetch cycle to disk. The invention also provides data integrity because the same data is used throughout by all WFA objects 11 for a particular transaction or set of embedded transactions.

Figure 4:
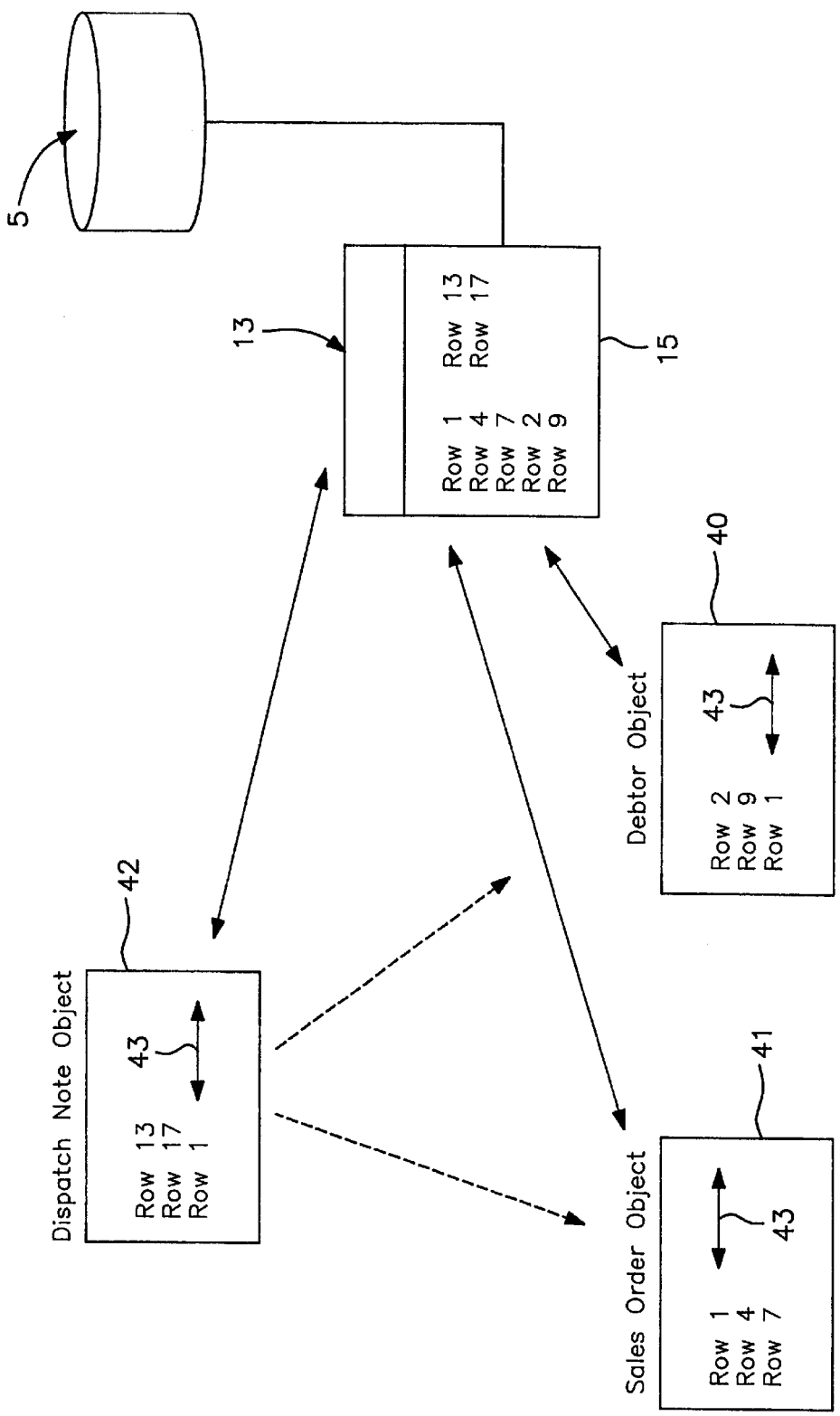
FIG. 4 is an illustrative example of primitive objects.

Referring now to FIG. 4, a simple example is given of the manner in which primitive objects are built. A debtor WFA object 40, a sales order WFA object 41, and a dispatch note WFA object 42 are used for performing a dispatch note transaction. The objects 40 and 41 are subsidiary to the dispatch note object 42. Each of these objects needs to access data from the database 5 and the particular rows which are required are illustrated. As indicated by the arrows 43, row 1 is required by all three objects. The object for this row is stored only once and a reference is transmitted when it is requested by the second and third objects in the requesting order.

It will be appreciated that the system operation achieves consistent data management for transaction processing and object persistence. The state machine allows complete database transparency—thus allowing flexibility and quicker response times as the WFA object does not perform database access operations. A fast response is also allowed because the state machine avoids multiple database fetch cycles for data records. Consistency of data is achieved because data is retrieved as a primitive object and this is not copied—all WFA objects 11 for a transaction accessing the one primitive object 12. The invention also achieves transaction isolation with security for complex transactions. This is because embedded transactions are controlled and a WFA object 11 can not update a primitive object 12 of a different transaction and if it tries to do so the transaction will not commit.

Referring now to FIG. 5, the method by which the system 1 is developed is now described. The method is indicated generally by the numeral 50 and in step 51 a data model is created. The data model is a structure of relational tables having one row per data record. This structure is set according to the system requirements. Many different systems have a similar data structure requirement. Thus it has been found that development of the data model is very fast because a template is provided for many different systems and relatively little modification of the template is required.

In step 52 a primitive object class is built for each table. This links data processing objects with the table in a manner which allows subsequently very fast data retrieval and independence of the data processing objects from the database structure. In step 53, the core persistent object model, which is a combination of the data model and the primitive object classes, is approved. This is an important step because this model provides a foundation for the overall system. In step 54, a WFA object class is developed according to the transaction processing criteria. In step 55, a UI object class is developed. This is configured for both overall control of a transaction and for user interfacing.

In step 56 data is written to the relational tables, and with user interaction in step 57 a UI object is created as an instance of the UI object class. The UI object in turn creates an instance of the WFA object class in step 58 according to the nature of the user input.

At this stage of the development method there exists a core persistent object model, a set of UI objects, and a set of WFA objects. These are validated in step 59.

In step 60, a WFA object accesses a state machine to request a primitive object. This step is performed under the instructions of a user via a UI object. In step 61, the state machine creates and stores a primitive object. Step 60 and 61 are repeated as indicated by step 62 until testing is complete.

It will be appreciated that the invention allows development of an object orientated data processing system with a short lead time because development of the primitive objects is very quick. Provided the core persistent object model is valid, the remaining steps are relatively short and simple as little debugging is required. Further, the core persistent object model itself may be developed very quickly from templates structured according to common business organisational structures.

The invention is not limited to the embodiments described., but may be varied in construction and detail within the scope of the claims.

What is claimed is:

1. A data processing system comprising a processor connected to memory, a user interface, an output interface, and a data storage device storing a database, the processor is operable according to program commands directing object-oriented processing, the processor operates as directed by a work flow activity object for transaction data processing, as directed by a user interface object for user interfacing, and as directed by a data management state machine for interaction with the data storage device;

an object is operable to direct creation of an instance of the state machine for each transaction;

the work flow activity object is operable to request a primitive object from the state machine when data is required; and the state machine is operable to access a database and to build a primitive object corresponding to each data request, each primitive object being operable in conjunction with a work flow activity object to perform transaction processing;

the state machine is operable to store a reference to each primitive object in a temporary stack and to pass the reference to the requesting work flow activity object;

the state machine is operable to search the stack for an existing required primitive object before building a fresh primitive object;

each work flow activity object is operable to pass a data extract to the user interface object, and the user interface object is operable to manipulate the data extract and to request the source work flow activity object to validate the data manipulation; and the user interface object is operable to initiate a transaction termination by instructing the state machine to perform a transaction commit.

2. The data processing system as claimed in claim 1, wherein the database has a relational table structure, and the state machine is operable to build a primitive object associated with a single table row.

3. The data processing system as claimed in claim 2, wherein each work flow activity object is operable to pass a primitive object identifier to the state machine to request data, and the state machine is operable to build the primitive object by instantiating a primitive object class.

4. The data processing system as claimed in claim 3, wherein the database includes one relational database table per primitive object class.

5. The data processing system as claimed in claim 1 wherein the state machine is operable to flush all modified primitive objects of the stack to the database for a transaction commit.

6. The data processing system as claimed in claim 1, wherein the primitive object is operable to automatically notify the state machine when updated.

7. The data processing system as claimed in claim 1, wherein each work flow activity object is operable to instruct the state machine to handle an embedded transaction, and the state machine is programmed to respond by creating a new instance for the embedded transaction.

8. The data processing system as claimed in claim 7, wherein the state machine is operable to validate completion of all lower-level instances before terminating a transaction.

9. A computer program product comprising software commands for execution on a digital computer comprising a processor connected to memory, a user interface, an output interface, and a data storage device storing a database, wherein the program commands direct object-oriented processing, the processor operates as directed by a work flow activity object for transaction data processing, as directed by a user interface object for user interfacing, and as directed by a data management state machine for interaction with the data storage device;

an object is operable to direct creation of an instance of the state machine for each transaction;

the work flow activity object is operable to request a primitive object from the state machine when data is required; and the state machine is operable to access a database and to build a primitive object corresponding to each data request, each primitive object being operable in conjunction with a work flow activity object to perform transaction processing;

the state machine is operable to store a reference to each primitive object in a temporary stack and to pass the reference to the requesting work flow activity object;

the state machine is operable to search the stack for an existing required primitive object before building a fresh primitive object;

each work flow activity object is operable to pass a data extract to the user interface object, and the user interface object is operable to manipulate the data extract and to request the source work flow activity object to validate the data manipulation; and the user interface object is operable to initiate a transaction termination by instructing the state machine to perform a transaction commit.

* * * * *